United States Patent
Huang (10) Patent No.: US 8,033,549 B2
(45) Date of Patent: Oct. 11, 2011

(54) MECHANICAL SEAL

(75) Inventor: Cheng-Shiou Huang, Kaohsiung (TW)

(73) Assignee: Scenic Precise Element Inc., Kaohsiung (TW)

( * ) Notice: Subject to any disclaimer, the term of this patent is extended or adjusted under 35 U.S.C. 154(b) by 382 days.

(21) Appl. No.: 12/434,726

(22) Filed: May 4, 2009

(65) Prior Publication Data

US 2009/0212503 A1   Aug. 27, 2009

Related U.S. Application Data

(63) Continuation-in-part of application No. 11/380,123, filed on Apr. 25, 2006, now abandoned.

(51) Int. Cl.
*F16J 15/34* (2006.01)
(52) U.S. Cl. .......................... 277/366; 277/373; 277/408
(58) Field of Classification Search .................. 277/361, 277/363, 366, 373, 408
See application file for complete search history.

(56) References Cited

U.S. PATENT DOCUMENTS

| | | | | |
|---|---|---|---|---|
| 2,383,667 A * | 8/1945 | Matter | ........................... | 277/366 |
| 2,836,440 A * | 5/1958 | Brumagim | ................... | 277/366 |
| 2,853,020 A * | 9/1958 | Hollinger et al. | ............ | 384/131 |
| 3,068,014 A | 12/1962 | Wilkinson | ..................... | 277/399 |
| 3,081,095 A * | 3/1963 | Hamrick | ......................... | 277/304 |
| 3,250,539 A * | 5/1966 | Kurz et al. | ..................... | 277/373 |
| 3,484,113 A * | 12/1969 | Moore | ........................... | 277/366 |
| 3,531,131 A | 9/1970 | Hummer | ........................ | 277/397 |
| 3,612,548 A | 10/1971 | Tracy | .............................. | 277/385 |
| 3,782,739 A * | 1/1974 | Kahanek et al. | .............. | 277/408 |
| 3,877,706 A | 4/1975 | Haas et al. | ..................... | 277/366 |
| 3,888,495 A | 6/1975 | Mayer | ............................... | 277/3 |
| 3,931,978 A | 1/1976 | Grimston | ........................ | 277/385 |
| 4,094,513 A | 6/1978 | Kime et al. | .................... | 277/366 |
| 4,103,907 A | 8/1978 | Inouye et al. | ................. | 277/96.1 |
| 4,109,920 A * | 8/1978 | Wiese | ............................ | 277/408 |
| 4,202,553 A | 5/1980 | Kropp | ............................ | 277/366 |
| 4,213,618 A | 7/1980 | Thurber | ........................... | 277/93 |
| 4,294,454 A * | 10/1981 | Cannings | ....................... | 277/366 |
| 4,361,334 A * | 11/1982 | Amorese et al. | ............... | 277/405 |
| 4,377,290 A * | 3/1983 | Netzel | ............................ | 277/368 |
| 4,381,867 A * | 5/1983 | Ohgoshi | ......................... | 277/366 |
| 5,375,853 A | 12/1994 | Wasser et al. | ................... | 277/59 |
| 5,409,241 A * | 4/1995 | Bowers | .......................... | 277/366 |
| 5,605,436 A * | 2/1997 | Pedersen | ................... | 415/170.1 |
| 5,713,576 A | 2/1998 | Wasser et al. | ...................... | 277/1 |
| 6,250,876 B1 | 6/2001 | Hogholt | ........................... | 415/17 |
| 6,471,214 B1 * | 10/2002 | Tornare et al. | ................. | 277/399 |
| 6,641,140 B1 * | 11/2003 | Matsumoto et al. | ........... | 277/366 |
| 2003/0006561 A1 | 1/2003 | Takahashi et al. | ............... | 277/408 |
| 2003/0178785 A1 | 9/2003 | Egashira et al. | ................. | 277/500 |
| 2004/0169337 A1 | 9/2004 | Watanabe et al. | .............. | 277/375 |
| 2004/0251633 A1 | 12/2004 | Huang | ............................ | 277/358 |
| 2008/0111314 A1* | 5/2008 | Huang | ............................ | 277/354 |
| 2009/0140494 A1* | 6/2009 | Roddis | ........................... | 277/408 |

* cited by examiner

*Primary Examiner* — Alison Pickard
(74) *Attorney, Agent, or Firm* — Alan Kamrath; Kamrath & Associates PA (57) ABSTRACT

A rotating assembly of a mechanical seal includes a retainer, a pair of compression rings, a shaft sleeve, a first rotating seal ring and a second rotating seal ring. The retainer includes a plurality of spring members and a plurality of slide legs longitudinally extended in opposite directions to define limiting spaces where the compression rings are correspondingly restricted. The compression rings are located at opposite sides of the retainer between which the spring members are arranged. In assembling, the retainer, the compression rings, the first rotating seal ring and the second rotating seal ring are assembled on the shaft sleeve. Spring forces of the spring members can actuate the compression rings to push the first rotating seal ring and the second rotating seal ring in the opposite directions.

20 Claims, 12 Drawing Sheets

FIG. 14

MECHANICAL SEAL

This is a continuation-in-part application of U.S. patent application Ser. No. 11/380,123 filed on Apr. 25, 2006 now abandoned.

BACKGROUND OF THE INVENTION

1. Field of the Invention

The present invention relates to a mechanical seal, and, particularly, to a mechanical seal with a retainer holding two compression rings by engaging blocks and engaging with two rotating seal rings by a plurality of slide legs.

2. Description of the Related Art

Figure 1:
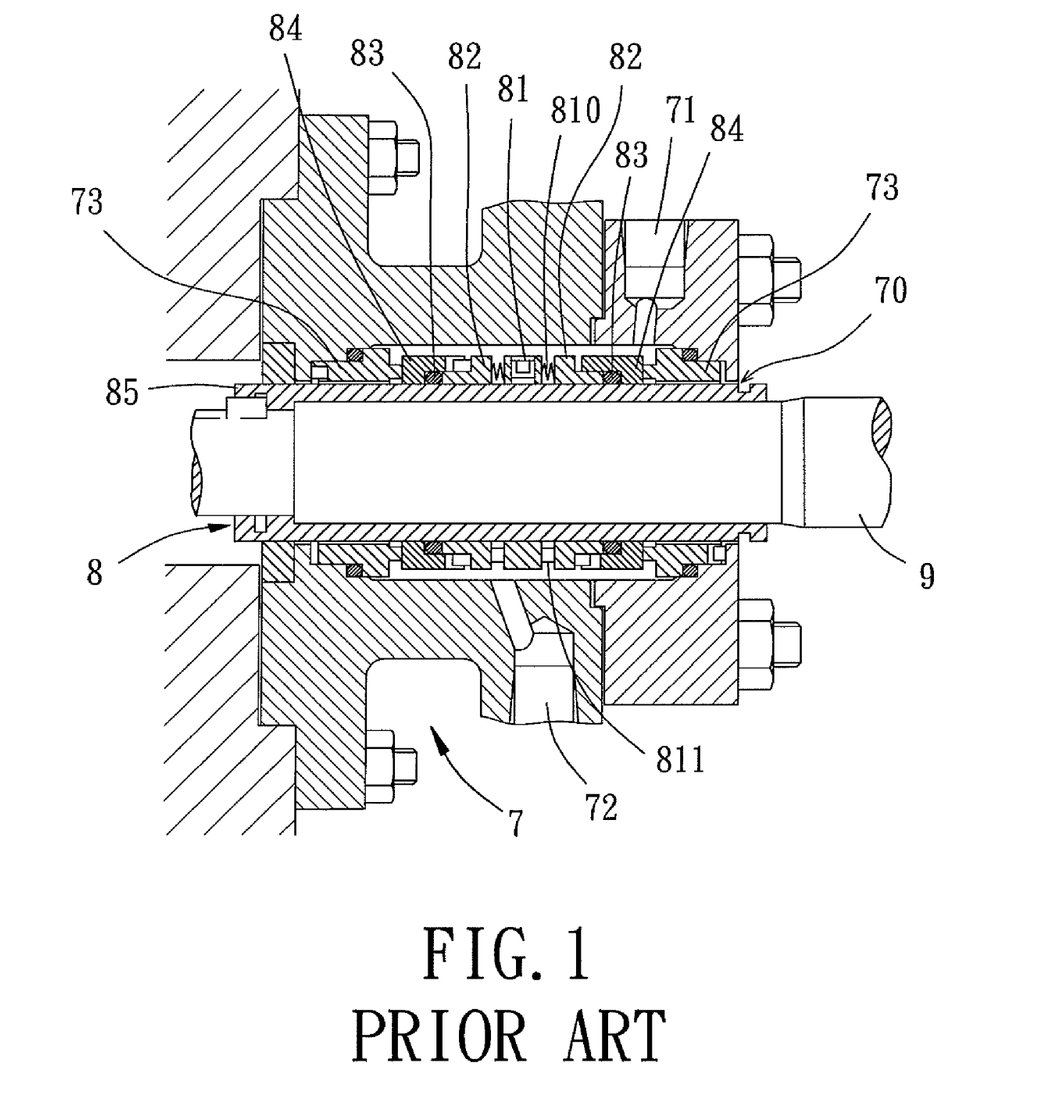
FIG. 1 is a cross-sectional view of a conventional mechanical seal in accordance with the prior art.

Referring initially to FIG. 1, a conventional rotary machine such as a pump system has a shaft 9, which may be used to stir liquids contained in a housing such as a liquid tank. In rotating operation, the rotary machine functions as a stirring apparatus of the housing for example. The rotary machine generally includes a mechanical seal for keeping the stirred liquids within the housing.

Typically, the mechanical seal includes a gland 7 and a rotating assembly 8. The gland 7 permits extension of the shaft 9 and mounts the shaft 9 on equipments such as the said housing. The rotating assembly 8 is securely mounted on and rotated with the shaft 9 while being received in the gland 7. The gland 7 includes a shaft bore 70, a fluid inlet 71, and a fluid outlet 72. The shaft bore 70 longitudinally extends through the body of the gland 7 for the rotating assembly 8 and shaft 9 to pass through. The fluid inlet 71 and fluid outlet 72 both communicate the outside of the gland 7 and the shaft bore 70 for gas or a coolant to be guided into and out of the shaft bore 70 through the fluid inlet 71 and the fluid outlet 72. Besides, two stationary seal rings 73 are oppositely received in the shaft bore 70 at two ends thereof, and longitudinally sandwiched between the gland 7 and rotating assembly 8, with both of the stationary seal rings 73 being able to move longitudinally.

The rotating assembly 8 includes a retainer 81, a pair of compression rings 82, a pair of O-rings 83, a pair of rotating seal rings 84 and a shaft sleeve 85. The retainer 81, the compression rings 82, the O-rings 83 and the rotating seal rings 84 are mounted and assembled on an outer periphery of the shaft sleeve 85. There are a series of spring members 810 provided on each of two longitudinally opposite sides of the retainer 81 for bias forces of the spring members 810 to oppositely push the two compression rings 82 outwards relative to the retainer 81. Besides, a plurality of pins 811 are also sandwiched between the retainer 81 and the compression rings 82 for preventing the compression rings 82 from revolving about the shaft 9. Two side surfaces of each compression rings 82 are respectively in contact with the corresponding spring members 810 and the corresponding rotating seal ring 84. The O-rings 83 are disposed between the compression rings 82 and the rotating seal rings 84 for providing sealing effects therebetween. Each of the rotating seal rings 84 closely abuts one of the stationary seal rings 73. Furthermore, the shaft sleeve 85 is mounted on the shaft 9 and rotated therewith.

When the shaft 9 rotates, the stationary seal rings 73 in the shaft bore 70 of the gland 7 elastically abut against the rotating seal rings 84 of the rotating assembly 8. In long-term use, there are abrasions occurring between the stationary seal rings 73 and the rotating seal rings 84 of the rotating assembly 8. The bias forces of the spring members 810 ensure no gap existing between the stationary seal rings 73 and the rotating seal rings 84 by successively pushing the rotating seal rings 84 through the corresponding compression rings 82. Consequently, the bias forces of the spring members 810 can reduce the possibilities of liquid leakage in the interior of the mechanical seal.

The conventional mechanical seal has several drawbacks in manufacture. In the installing process, the spring members 810 must be disposed between each side of the retainer 81 and the corresponding rotating seal rings 84 without any positioning member before the whole rotating assembly 8 is completely fixed on the shaft 9. The primary problem in such a structure is the difficulty in assembling or maintaining due to the fact that the spring members 810 may be easily fallen off from the retainer 81. Disadvantageously, this may result in a low efficiency in assembly of the above-mentioned elements of the mechanical seal. Moreover, convenience in assembly is especially important for repair or replacement of the rotating seal rings 84 due to the said abrasions thereof.

Another problem naturally occurring during use of such a mechanical seal is due to the fact that liquids contained in the housing may permeate through a clearance existing between the compression ring 82 and the rotating seal rings 84. With the structure shown in FIG. 1, because the spring members 810 for pushing the rotating seal rings 84 at two sides of the retainer 81 are isolated, there is no assistant effect provided by the spring members 810 to prevent the compression rings 82 from revolving about the shaft 9. In this circumstance, the liquid pressure can press the O-ring 83 and the compression ring 82 to be moved backward to the retainer 81, and thus can further compress the spring members 810 to be retracted. Consequently, the rotating seal rings 84 cannot exactly abut against the corresponding stationary seal rings 73. Disadvantageously, the possibility of leakage in such a mechanical seal is increased.

Another conventional mechanical seal in U.S. Pat. No. 5,375,853 and titled "SECONDARY CONTAINMENT SEAL" discloses a retainer with a cylindrical outer circumferential and an inner wall, and an annular disk element with several apertures is arranged along a central portion of the inner wall. Therefore, a plurality of springs can be inserted in the apertures and sandwiched between a pair of discs disposed on two sides of the annular disk element, with the said springs oppositely pushing two rotating seal rings to respectively abut two stationary seal rings through the said pair of discs. However, in order to retain the discs and rotating seal rings within the retainer, there should be an internal groove adjacent to each end of the retainer for receiving a snap ring with a radially extending wall. As a result, the invention disclosed in the said cited patent provides a complex structure and an assembly process that are still inconvenient for processing the repair or replacement of the rotating seal rings. Furthermore, in operation, the retainer of this cited structure has to suffer a large torque and a revolving movement of the discs. Besides, still another conventional mechanical seal disclosed by U.S. Pat. No. 3,888,495, titled "DUAL-COOLED SLIDE RING SEAL," provides a structure similar to the last cited patent and also has the same problem of inconvenience in assembly.

Another US patent titled "SELF-CONTAINED ROTARY MECHANICAL SEALS" and U.S. Pat. No. 4,213,618 shows another conventional mechanical seal mounted on a shaft for rotating therewith and including a lug holder, a plurality of lugs, a plurality of belleville washers, a contact washer, and a carbon seal washer. The lug holder is radially fixed around the shaft, with the lugs extending from the lug holder and parallel to the shaft. The belleville washers are radially surrounded by the lugs and axially compressed between the lug holder and the contact washer to create a spring force urging the carbon seal washer forwards into abutting against a seal seat. Regarding to this conventional invention, what is characterized is that a plurality of tines extending from the lugs in a direction perpendicular to the lugs and concentric to the shaft is provided while several shoulders radially extend from the carbon seal washer. Besides, the shoulders are dimensioned for engagement with the lugs and tines. In detail, a distance of a gap between two adjacent tines of two different lugs is not smaller than a length of the shoulder, so that the shoulder can pass through the gap and received between the said two different lugs. Although convenience in assembly for mechanical seal is improved by this conventional invention, the belleville washers and contact washer are still easy to fall out of the space defined by the lugs once the carbon seal washer is removed. And this is inconvenient for repair or replacement of the carbon seal washer as well. Furthermore, because the carbon seal washer directly abuts against the tines, the shoulders may be easily damaged due to axially pushing force of the belleville washers. Hence, there is a need for a further improvement over the conventional mechanical seal.

SUMMARY OF THE INVENTION

The primary objective of this invention is to provide a mechanical seal with a retainer and two compression rings for easily maintaining a plurality of spring members between the two compression rings and in a plurality of spring holes of the retainer while two rotating seal rings are axially released from the retainer, with the retainer further providing a plurality of engaging blocks for retaining the compression rings and spring members in the retainer. And, the mechanical seal is used as a dual cartridge seal with two-way-pushing spring members to provide a balanced structure. As a result, the release of the rotating seal rings are completed without disengagement between the spring members, retainer, and compression rings, and only stationary seal rings and rotating seal rings have to be routinely replaced.

The secondary objective of this invention is to provide the mechanical seal, which has a shaft sleeve with a positioning flange disposed at an outer periphery thereof to limit an axial movement of an O-ring or one of the rotating seal rings. Accordingly, the positioning flange of the shaft sleeve can enhance the sealing effect of the rotating assembly.

Another objective of this invention is to provide the mechanical seal with a reduced area of the said interface. Accordingly, the mechanical seal is suitable for use in viscous liquid stir.

Further another objective of this invention is to provide the mechanical seal with a stirring unit that forms an end of the shaft sleeve and faces the said interface. Consequently, suspended impurities in the liquid are unable to accumulate in the said interface.

The mechanical seal in accordance with an aspect of the present invention includes an gland for being mounted on a housing, a rotating assembly for being passed through by a shaft, and two stationary seal rings separately installed on the gland, with the rotating assembly being arranged between the gland and the stationary seal rings. An inner wall of the gland defines a shaft bore for the rotating assembly as well as the shaft to pass through. And the rotating assembly comprises a retainer, a first compression ring, a second compression ring, a plurality of spring members, a first rotating seal ring, a second rotating seal ring, an a shaft sleeve. The retainer has a primary ring, a plurality of first slide legs, and a plurality of second slide legs. The primary ring is coaxial with the shaft bore and defines a first axial surface and a second axial surface at two axial ends thereof, and a plurality of spring holes communicate the said first and second axial surfaces. The first slide legs are formed on the first axial surface and axially extend outwards while an free end of each first slide leg has a first engaging block protruding to an axial line of the shaft bore. The second slide legs are formed on the second axial surface and axially extend outwards while an free end of each second slide leg has a second engaging block protruding to the said axial line. The first compression ring is coaxial with the shaft bore and formed with at least one cutaway portion at an outer periphery thereof. And the first compression ring is movably positioned between the first axial surface and the first engaging block in axial direction and is radially surrounded by the first slide legs. The second compression ring is also coaxial with the shaft bore and formed with at least one cutaway portion at an outer periphery thereof. And the second compression ring is movably positioned between the second axial surface and the second engaging block in axial direction and is radially surrounded by the second slide legs. The spring members are separately received in the spring holes and oppositely abut against the first and second compression rings with two ends. The first rotating seal ring has one end being abutted by the first compression ring, and a plurality of first notches are formed in a outer periphery of the first rotating seal ring. And an amount of the first notches is not less than an amount of the first slide legs for each first slide leg to be received in and engaged with one of the first notches. The second rotating seal ring has one end being abutted by the second compression ring, and a plurality of second notches are formed in a outer periphery of the second rotating seal ring. And an amount of the second notches is not less than an amount of the second slide legs for each second slide leg to be received in and engaged with one of the second notches. The shaft sleeve for mounted on the shaft sequentially passes through one of the stationary seal rings, the first rotating seal ring, first compression ring, primary ring of the retainer, second compression ring, second rotating seal ring, and the other stationary seal ring. The spring members oppositely push the first and second rotating seal rings through the first and second compression rings. And thus the first and second rotating seal rings respectively abut against the two stationary seal rings to form an interface between the first rotating seal ring and one of the stationary seal rings and another interface between the second rotating seal ring and the other stationary seal ring. A smallest distance form the axial line of the shaft bore to each cutaway portion is not larger than a distance from the said axial line to each first or second engaging block, and radiuses of the outer peripheries of the two compression rings out of the at least one cutaway portion are larger than the said distance between the said axial line and each first or second engaging block, but are not larger than a smallest distance form the said axial line to each slide leg excluded the engaging blocks. The at least one cutaway portion of the first compression ring is mis-aligned with each first slide leg for the first compression ring to be limited between the first engaging blocks and the first axial surface, and the at least one cutaway portion of the second compression ring is mis-aligned with each second slide leg for the second compression ring to be limited between the second engaging blocks and the second axial surface.

In a separate aspect of the present invention, an end of the shaft sleeve adjacent to the first rotating seal ring forms at least one helical groove facing the said interface between the first rotating seal ring and the corresponding stationary seal ring, with a circular extending direction of each helical groove or helical blade being opposite to a rotating direction of the shaft.

In a further separate aspect of the present invention, at least one untaken notch is inclined relative to the first or second slide leg when the number of the notches of the first or second rotating seal ring is larger than the number of the first or second slide leg.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the term "first", "second", "inner", "outer" "axial", "radial" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Figure 2:
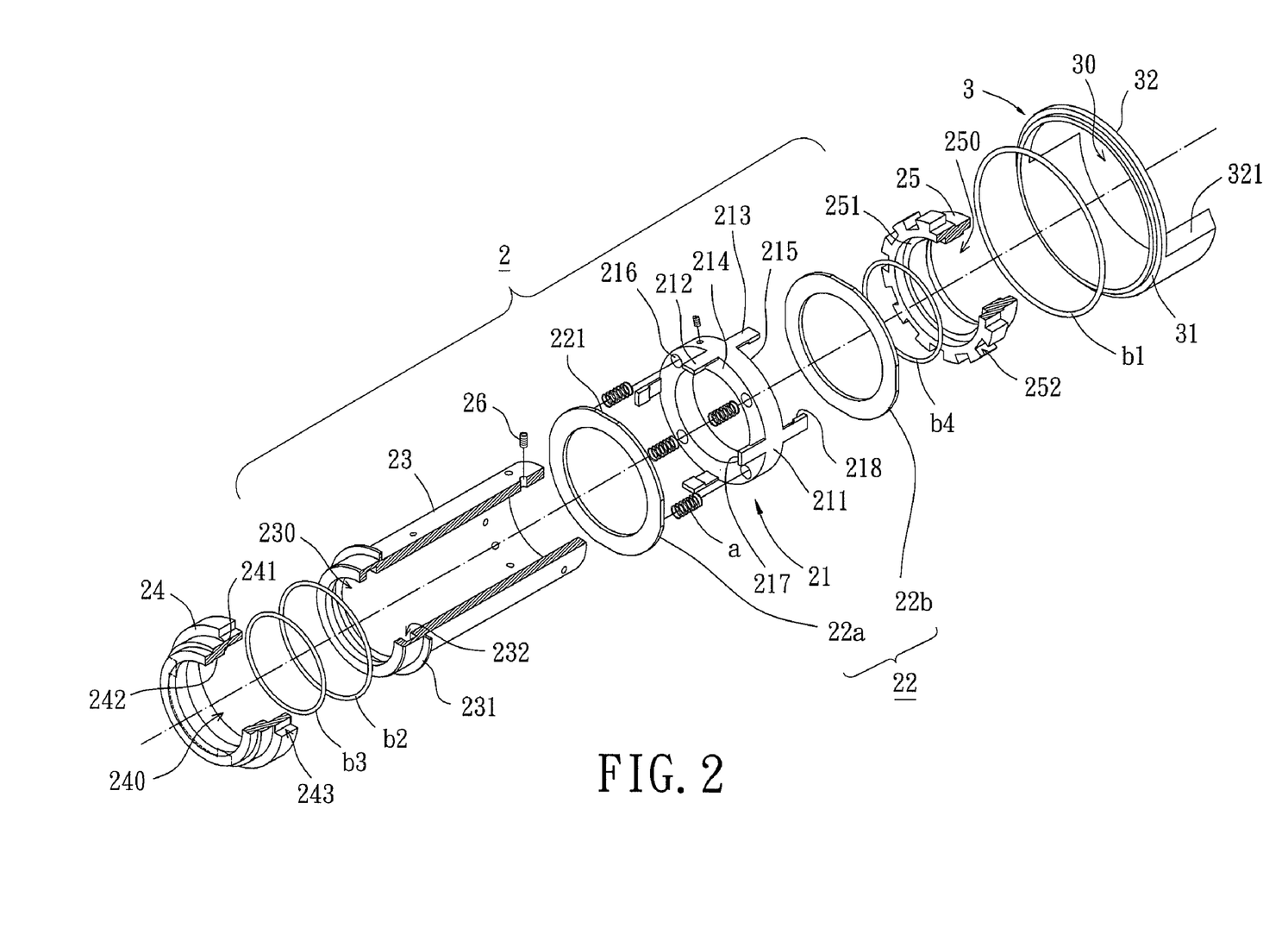
FIG. 2 is an exploded, perspective view of a rotating assembly and a fluid guiding member of a mechanical seal in accordance with a first embodiment of the present invention.
Figure 3:
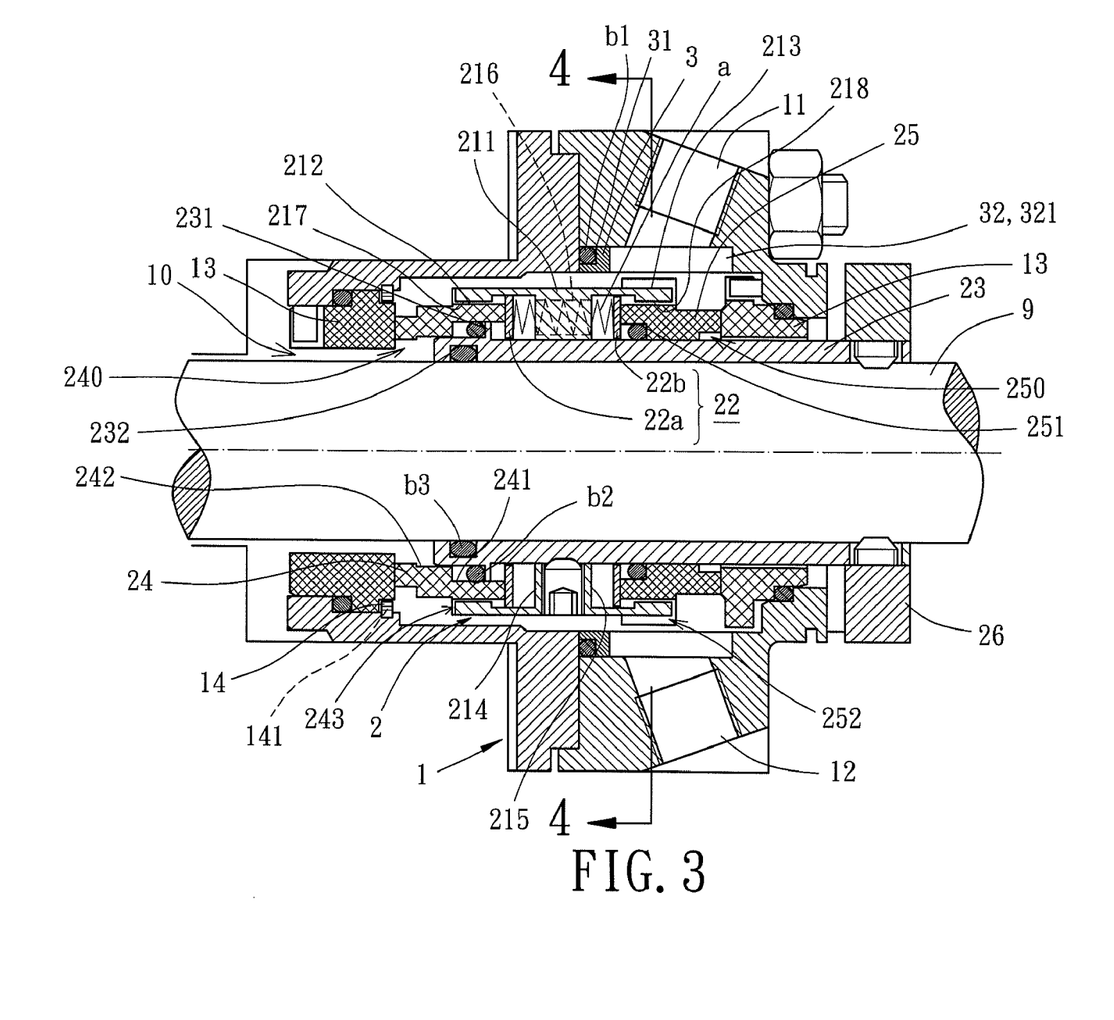
FIG. 3 is an assembled, cross-sectional view of the mechanical seal in accordance with the first embodiment of the present invention.
Figure 4:
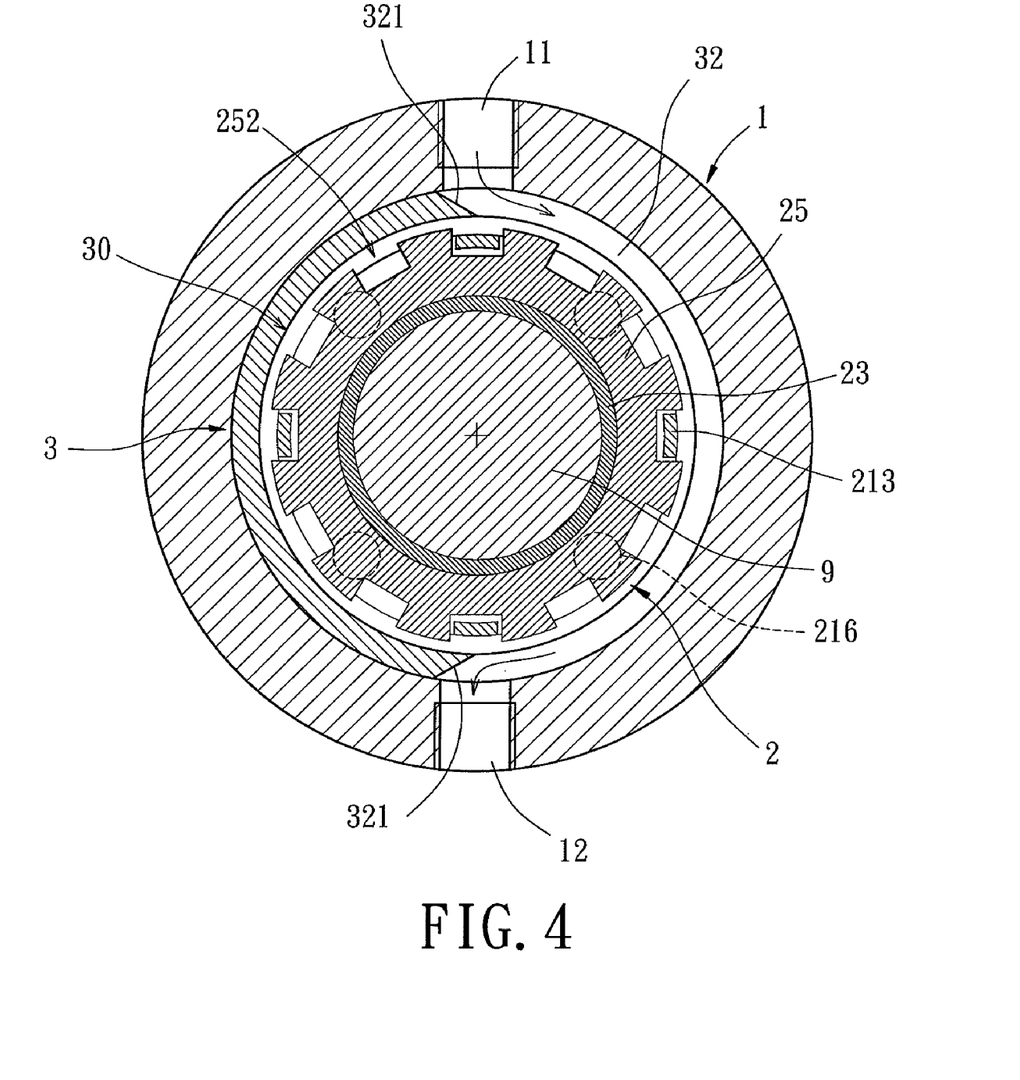
FIG. 4 is a cross-sectional view, taken along line 4-4 in FIG. 3, of a gland of the mechanical seal in accordance with the first embodiment of the present invention.

Referring now to FIGS. 2 through 4, views of a mechanical seal in accordance with a first embodiment of the present invention are shown, which includes a gland designated numeral 1, a rotating assembly designated numeral 2 and a fluid guiding member designated numeral 3. In the illustrated embodiment, the mechanical seal is installed between a rotary machine and a housing such as a liquid tank or the like for mechanically linking them.

Still referring to FIG. 3, construction of the gland 1 shall be described in detail. In the first embodiment, the gland 1 is firmly mounted on the housing and includes a shaft bore 10, a fluid inlet 11, and a fluid outlet 12. The shaft bore 10, through which the rotating assembly 2 and a shaft 9 extends, is penetratingly arranged along an axial direction of the gland 1 and defined by an inner wall of the gland 1. The fluid inlet 11 and fluid outlet 12 both communicate the outside of the gland 1 and the shaft bore 10, so that a fluid such as gas or a coolant can be guided into and out of the shaft bore 10 through the fluid inlet 11 and the fluid outlet 12. Preferably, the said fluid inlet 11 and fluid outlet 12 radially extend in the same axial level relative to the shaft bore 10. In operation, the fluid provides a heat exchange function, such as heat dissipation or heat absorption, to maintain a suitable operational temperature of the gland 1 and the rotating assembly 2. Besides, two stationary seal rings 13 are received in the shaft bore 10 at two opposite ends thereof, and axially compressed between the gland 1 and rotating assembly 2, with both of the stationary seal rings 13 being able to move along an axial direction of the gland 1.

Referring again to FIGS. 2 and 3, the construction of the rotating assembly 2 is described in detail as the following. In the first embodiment, the rotating assembly 2 is connected with the shaft 9 and includes a retainer 21, a pair of compression rings 22, a shaft sleeve 23, a first rotating seal ring 24, a second rotating seal ring 25 and a collar 26. Extending through the retainer 21 are a series of spring holes to receive spring members identified as "a". The compression rings 22 are located at either side of the retainer 21 and are in contact with ends of the spring members "a" received in the spring holes. In assembling, each of the compression rings 22 pushes the corresponding rotating seal ring 24 or 25 by spring forces of the spring members "a". The retainer 21, the compression rings 22, the first rotating seal ring 24 and the second rotating seal ring 25 are assembled on the shaft sleeve 23. The collar 26 securely connects with the shaft sleeve 23 on the shaft 9 such that the rotating assembly 2 may rotate with the shaft 9.

Preferably, the rotating seal rings 24, 25 may be made of wear resisting silicon carbide, carbon steel for example, and closely abut against the stationary seal rings 13 mounted in the gland 1. Besides, the first rotating seal ring 24 is at a side of the mechanical seal facing the inner of the housing, and the second rotating seal ring 25 is at another side of the mechanical seal adjacent to the atmospheric side. Constructions of the retainer 21, the compression rings 22, the shaft sleeve 23, the first rotating seal ring 24 and the second rotating seal ring 25 will be further described in greater detail below.

The construction of the fluid guiding member 3 shall be described in detail, still referring to FIGS. 2 through 4. In the first embodiment, the fluid guiding member 3 is mounted on the inner wall of the gland 1, adjacent to at least one of the fluid inlet and outlet 11, 12, and provided with an axial hole 30, a stepped portion 31 and a channel 32. Preferably, the fluid guiding member 3 is in a ring shape and coaxial with the shaft bore 10 of the gland 1. A diameter of the axial hole 30 allows the passage of any section of the rotating assembly 2 passed through by the shaft 9, as best shown in FIG. 3. An O-ring identified as "b1" rests on a side of the stepped portion 31 to seal a clearance existing between the inner wall of the gland 1 and the fluid guiding member 3 such that any possible leakage of liquid is prevented. The channel 32 is radially extended, connects an outer periphery and an inner periphery of the fluid guiding member 3, and aligns with both of the fluid inlet 11 and fluid outlet 12. Preferably, each of two opposite edges defining the channel 32 provides a guiding surface 321, and the two guiding surfaces 321 are adjacent to and obliquely face the fluid inlet 11 and fluid outlet 12 as best shown in FIG. 4. Therefore, each of the guiding surface 321 guides the incoming fluid from a direction along the fluid inlet 11 into a peripheral direction of the shaft bore 10, or guides the outgoing fluid from the peripheral direction of the shaft bore 10 into a direction along the fluid outlet 12.

Preferably, the retainer 21 is a monolithic one-piece member provided with a primary ring 211, a plurality of first slide legs 212, and a plurality of second slide legs 213. The primary ring 211 is coaxial with the shaft bore 10 and has a first axial surface 214, a second axial surface 215, and the series of spring holes, which are previously described and used for receiving the spring members "a", identified as "216." The first and second axial surfaces 214, 215 respectively form two axial ends of the primary ring 210 while the spring holes 215 communicate the two axial surfaces 213, 214. Furthermore, in assembly, the primary ring 210 radially surrounds the shaft sleeve 23. The first slide legs 211 are formed on the first axial surface 214 and axially extend outwards, and an free end of each first slide leg 211 has a first engaging block 217 protruding to an axial line of the shaft bore 1 of the gland 1. Similarly, The second slide legs 213 are formed on the second axial surface 215 and axially extend outwards, and an free end of each second slide leg 213 has a second engaging block 218 protruding to the axial line of the shaft bore 1. Preferably, the first and second engaging blocks 217, 218 are formed on inner surfaces of the first and second slide legs 212, 213, which directly face the axial line of the shaft bore 1.

Particularly referring to the FIGS. 2 and 5 through 8, a structure of each compression ring 22 and a relationship between the retainer 21 and the compression rings 22 are illustrated as the following. Each of the compression rings 22 is formed with at least one cutaway portion 221 at an outer periphery thereof. Besides, both of the compression rings 22 are also coaxial with the shaft bore 1. In order to clearly describe the precise relationship between the retainer 21 and the compression rings 22, the compression ring 22 faced by the first axial surface 214 of the retainer 21 is renamed and designated as "first compression ring 22a," and the compression ring 22 faced by the second axial surface 215 of the retainer 21 is renamed and designated as "second compression ring 22b." The first compression ring 22a is movably positioned between the first axial surface 214 and the first engaging blocks 217 in axial direction, and radially surrounded by the first slide legs 212. Similarly, The second compression ring 22b is movably positioned between the second axial surface 215 and the second engaging blocks 218 in axial direction, and radially surrounded by the second slide legs 213.

Figure 5:
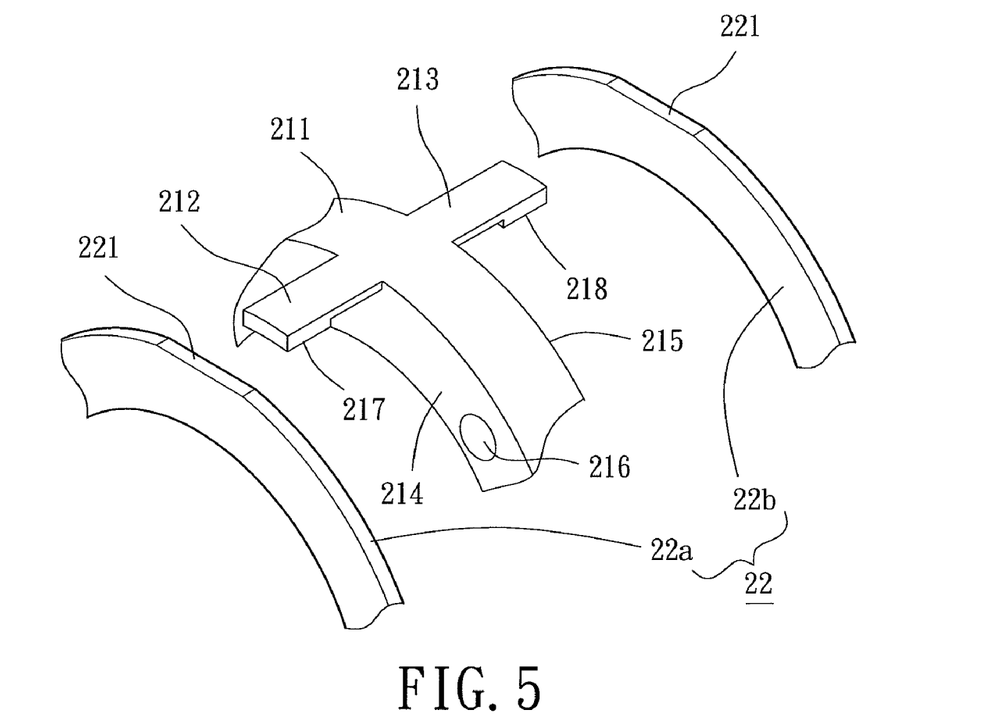
FIG. 5 is a partial, perspective view of a primary ring, slide legs, and compression rings before a fore-step in assembly is processed.
Figure 6:
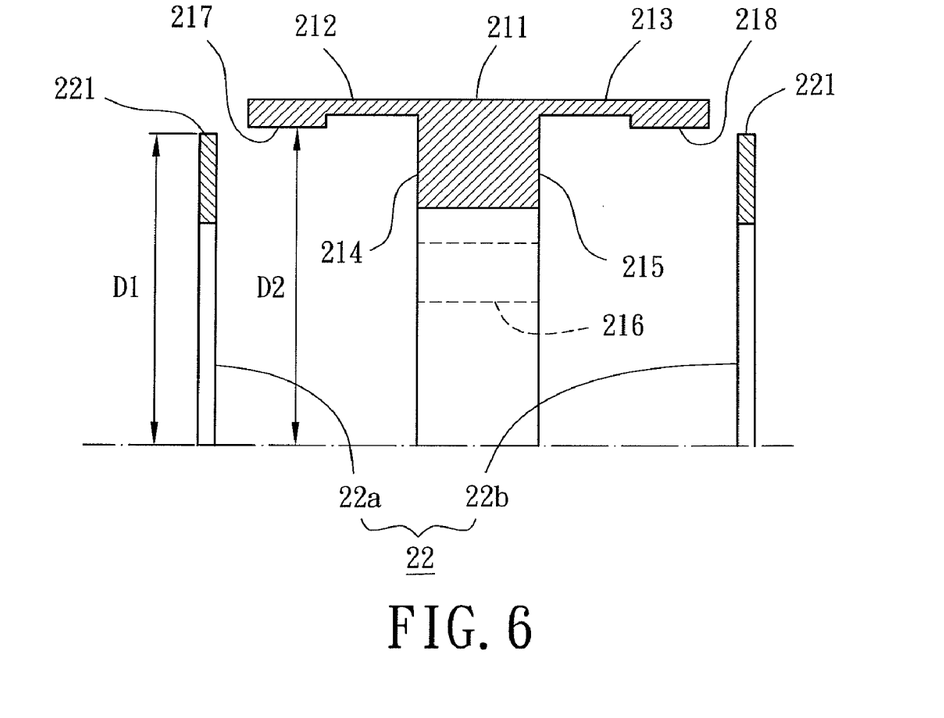
FIG. 6 is a partial, cross-sectional view of the primary ring, slide legs, and compression rings before the fore-step in assembly is processed.

Specifically, please refer to FIGS. 5 and 6, which show schematic, partial views of the retainer 21 and the first and second compression rings 22a, 22b before the two compression rings 22a, 22b being assembled into the retainer 21. The two compression rings 22a, 22b with the at least one cutaway portion 221 are characterized in that a smallest distance D1 form the axial line of the shaft bore 1 to each cutaway portion 221 is not larger than a distance D2 from the said axial line to each first or second engaging block 217 or 218. Besides, if there are plural cutaway portions 221 utilized in the compression rings 22a, 22b, each of the plural cutaway portions 221 corresponds to one of the slide legs 212, 213. Therefore, regarding to a fore-step in assembly, taking the first engaging block 217 and the first compression ring 22a for example, the at least one cutaway portion 221 initially aligns with at least one of the first slide legs 212 for the first compression rings 22a to be pressed into a space between the first engaging blocks 217 and the first axial surface 214 of the retainer 21. Please be noted that the pressing of the first compression ring 22a can be completed with the first compression ring 22a being parallel to the first axial surface 214 when the numbers of the first slide legs 212 and the at least one cutaway portion 221 are the same. Alternatively, the insertion of the first compression ring 22a is completed with the first compression ring 22a being inclined relative to the first axial surface 214 for passing the first engaging blocks 217. The insertion of the second compression ring 22b is complete in the same way to place the second compression ring 22b in a space between the second engaging blocks 218 and the second axial surface 215 of the retainer 21.

Figure 7:
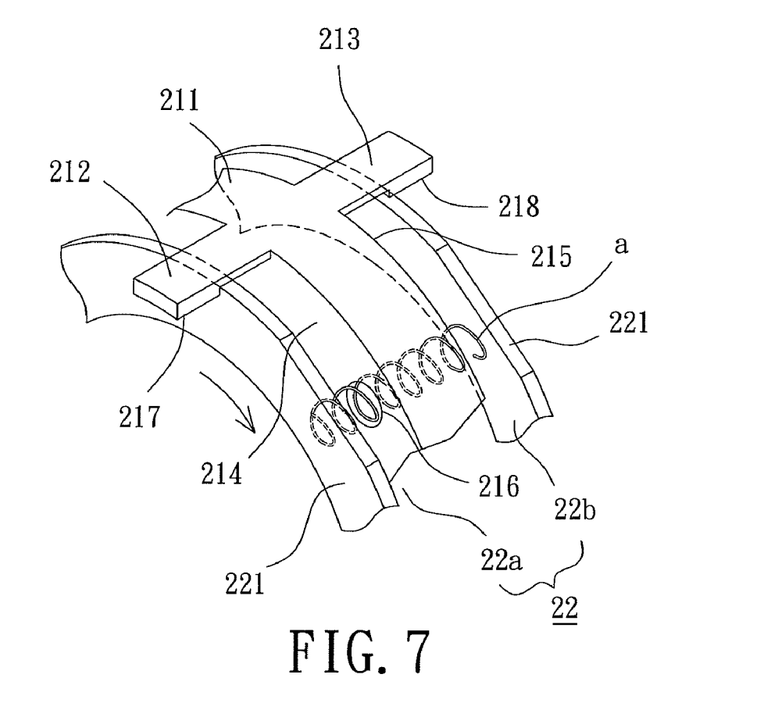
FIG. 7 is a partial, perspective view of the primary ring, slide legs, and compression rings after a later step in assembly is processed.
Figure 8:
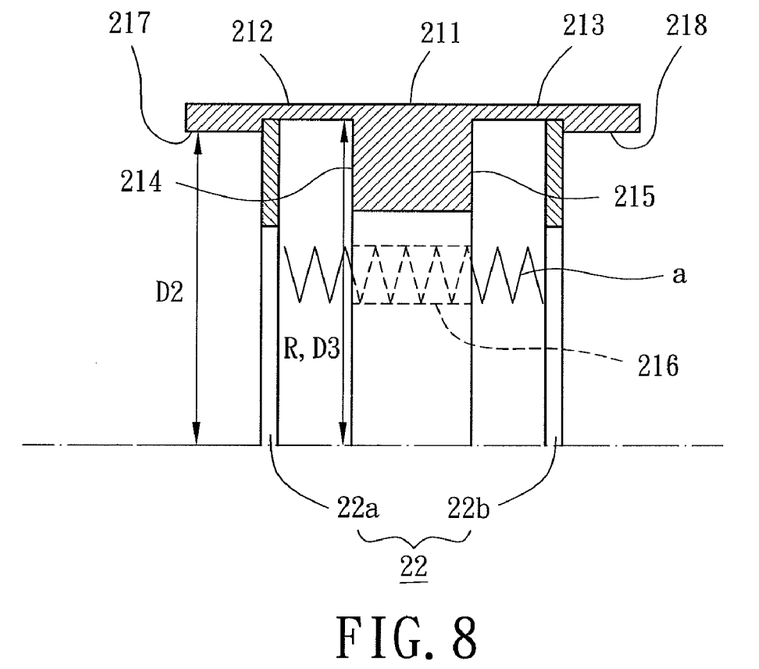
FIG. 8 is a partial, cross-sectional view of the primary ring, slide legs, and compression rings after the later step in assembly is processed.

Please further refer to FIGS. 7 and 8, which show schematic, partial views of the retainer 21 and the first and second compression rings 22a, 22b after the said fore-step in assembly is finished. The two compression rings 22a, 22b with the at least one cutaway portion 221 are further characterized in that radiuses R of the outer peripheries of the two compression rings 22a, 22b out of the at least one cutaway portion 221 are larger than the said distance D2 but not larger than a smallest distance D3 form the axial line of the shaft bore 1 to each slide leg 212 or 213 excluded the engaging blocks 217 or 218. Therefore, regarding to a later step in assembly, taking the first slide leg 212 and the first compression ring 22a for example, the first compression ring 22a is turned about the said axial line for the at least one cutaway portion 221 of the first compression ring 22a to be mis-aligned with each first slide leg 212. And thus the first compression ring 22a is exactly limited in the space between the first engaging blocks 217 and the first axial surface 214. Alternatively, the second compression ring 22b is also turned for being exactly limited in the space between the second engaging blocks 218 and the second axial surface 215 of the retainer 21. Therefore, an assembly of the retainer 21 and compression rings 22a, 22b can be easily completed by the following steps: firstly pressing or inserting the first compression ring 22a into the space between the first engaging blocks 217 and the first axial surface 214 through the said fore-step; turning the first compression ring 22a about the said axial line to complete the misalignment between the at least one cutaway portion 221 of the first compression ring 22a and each first slide leg 212 through the later step; placing the spring members "a" into the spring holes 216 of the retainer 21; pressing or inserting the second compression ring 22b into the space between the second engaging blocks 218 and the second axial surface 215 through the said fore-step; and turning the second compression ring 22b about the said axial line to complete the misalignment between the at least one cutaway portion 221 of the second compression ring 22b and each second slide leg 213 through the later step at last. As a result, the spring members "a" can be always maintained between the two compression rings 22a, 22b and in the spring holes 216.

Referring again to FIGS. 2 and 3, the shaft sleeve 23 is a monolithic body and includes a shaft-assembling hole 230, a positioning flange 231, and an annular groove 232. The shaft-assembling hole 230 is penetratingly arranged along an axial direction of the shaft sleeve 23 and coaxial with the gland 1 for the shaft 9 to extend through. The positioning flange 231 is disposed at an outer periphery of the shaft sleeve 23, and used to limit an axial movement of an O-ring identified as "b2" rested on the outer periphery of the shaft sleeve 23, as best shown in FIG. 3, so as to provide a greater sealing effect. Alternatively, the positioning flange 231 can also be used to limit an axial movement of the first rotating seal ring. In rotating operation, the O-ring "b2" functions to prevent any possible leakage of liquids contained in the housing via a clearance existing between the shaft sleeve 23 and the first rotating seal ring 24. Provided on an inner periphery of the shaft sleeve 23 is the annular groove 232 in which receives another O-ring identified as "b3". Similarly, the O-ring "b3" functions to prevent any possible leakage of liquids contained in the housing via a clearance existing between the shaft sleeve 23 and the shaft 9. Besides, the retainer 21 is firmly mounted around the shaft sleeve 23, preferably, by means of screw connection as shown in FIGS. 2 and 3.

Still referring to FIGS. 2 and 3, the first rotating seal ring 24 is provided with an axial hole 240, a first stepped portion 241, a second stepped portion 242 and a plurality of notches 243, and is abutted by the first compression ring 22a and pushed by the spring members "a" through the first compression ring 22a. The axial hole 240 connects between two opposite sides of the first rotating seal ring 24. In assembling, the axial hole 240 permits the shaft sleeve 23 to extend through. The first stepped portion 241 and the second stepped portion 242 are formed on an inner periphery of the first rotating seal ring 24. Formed between the first stepped portion 241 and the positioning flange 231 is a space to receive the O-ring "b2". Formed on an outer periphery of the first rotating seal ring 24 are the notches 243 arranged on an annular flange (unlabeled), extending in a direction parallel to the first slide legs 212, and preferably being spaced out evenly. The number of the notches 243 is not less than that of the first slide legs 212 for the first slide legs 212 to be received in and engage with the notches 243.

Still referring to FIGS. 2 and 3, the second rotating seal ring 25 is provided with an axial hole 250, a stepped portion 251 and a plurality of notches 252, and is arranged to face the second axial surface 215 and pushed by the spring members "a" through the second compression ring 22a. The axial hole 250 connects between two opposite sides of the second rotating seal ring 25. In assembling, the axial hole 250 also permits the shaft sleeve 23 to extend through. The stepped portion 251 is formed on an inner periphery of the second rotating seal ring 25. An O-ring identified as "b4" is received in the stepped portion 251. Formed on an outer periphery of the second rotating seal ring 25 are the notches 252, which are also arranged on an annular flange (unlabeled). The number of the notches 252 is not less than that of the second slide legs 213 for the slide legs 211 to be received in and engage with the notches 252.

Accordingly, the first rotating seal ring 24, the retainer 21 and the second rotating seal ring 25 are mounted on the shaft sleeve 23 in order. And the repair or replacement of the rotating seal rings 24, 25 can surely be simply completed by axially taking off the rotating seal rings 24, 25 from the retainer 21 without a disengagement between the spring members "a," retainer 21, and compression rings 22. Please be noted that, when the number of the notches 243 or 252 is larger than that of the slide legs 212 or 213, those of the notches 243 or 252 that are untaken by the slide legs 212, 213 function as an impeller to drive the fluid in the gland 1 when the shaft 9 is rotated. Moreover, the first and second rotating seal rings 24, 25 are oppositely pushed by the spring members "a" to closely abut against the two stationary seal rings 13. Furthermore, a limiting member 14 may firmly engaged on the inner wall of the gland 1, adjacent to the stationary seal ring 13 abutted by the first rotating seal ring 24, and radially protruding inwards, so as to prevent failure of sealing due to a large axial movement of the said stationary seal ring 13. And the limiting member 14 is preferably formed in a ring shape and coaxial with the shaft bore 10 of the gland 1, with a plurality of through holes 141 extending between two axial faces of the limiting member 14.

Figure 9:
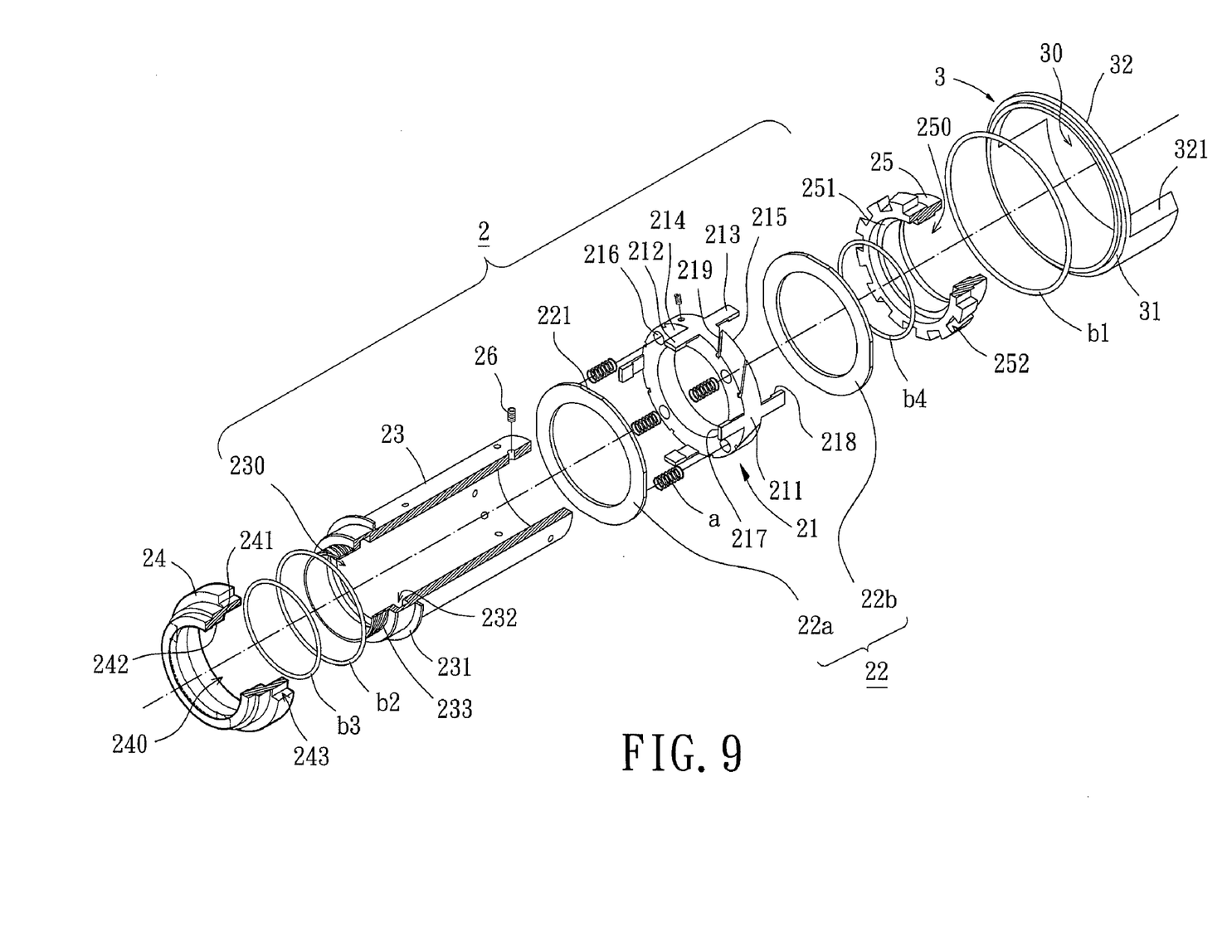
FIG. 9 is an exploded, perspective view of a rotating assembly and a fluid guiding member of a mechanical seal in accordance with a second embodiment of the present invention.
Figure 10:
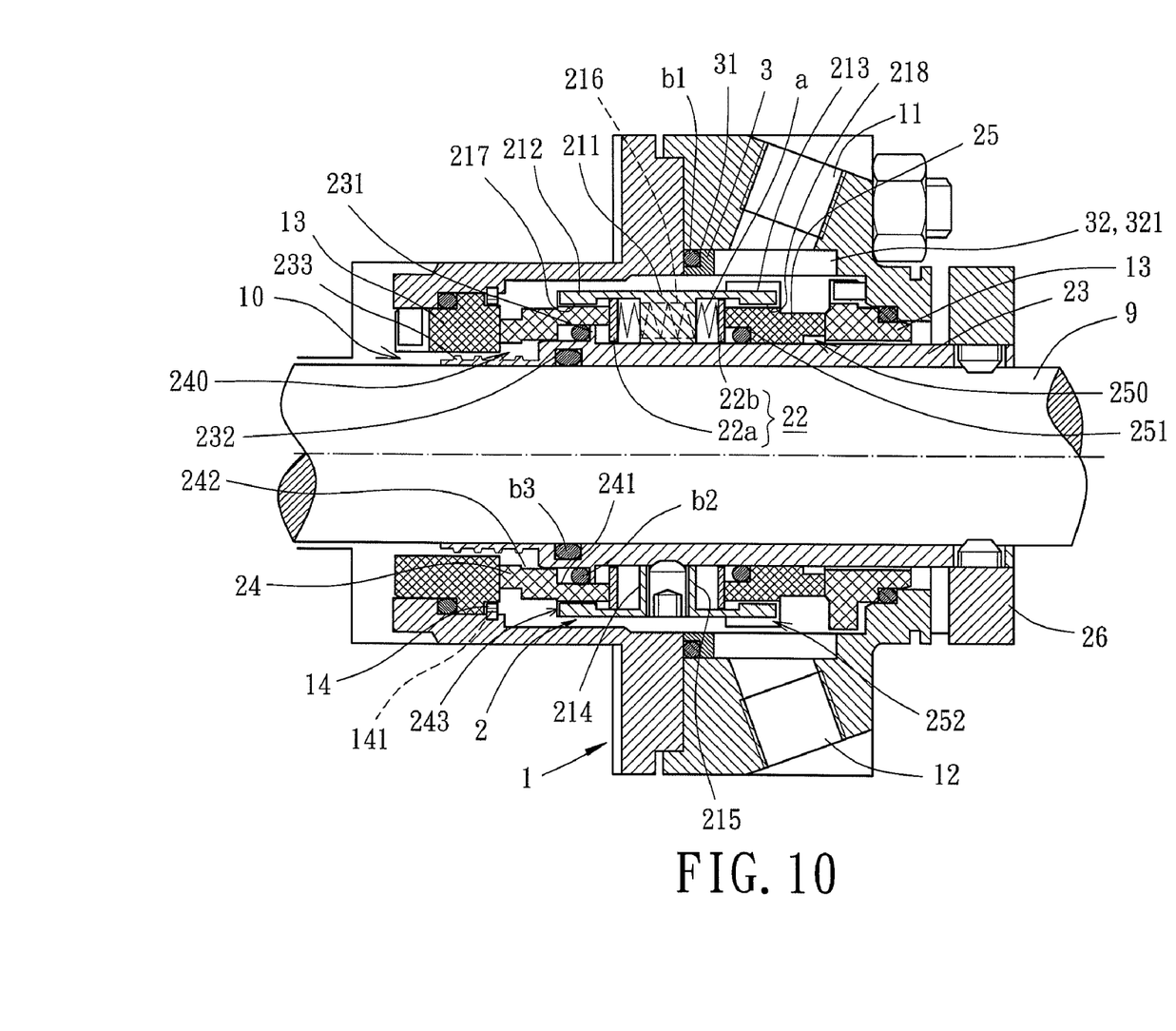
FIG. 10 is an assembled, cross-sectional view of the mechanical seal in accordance with the second embodiment of the present invention.
Figure 11A:
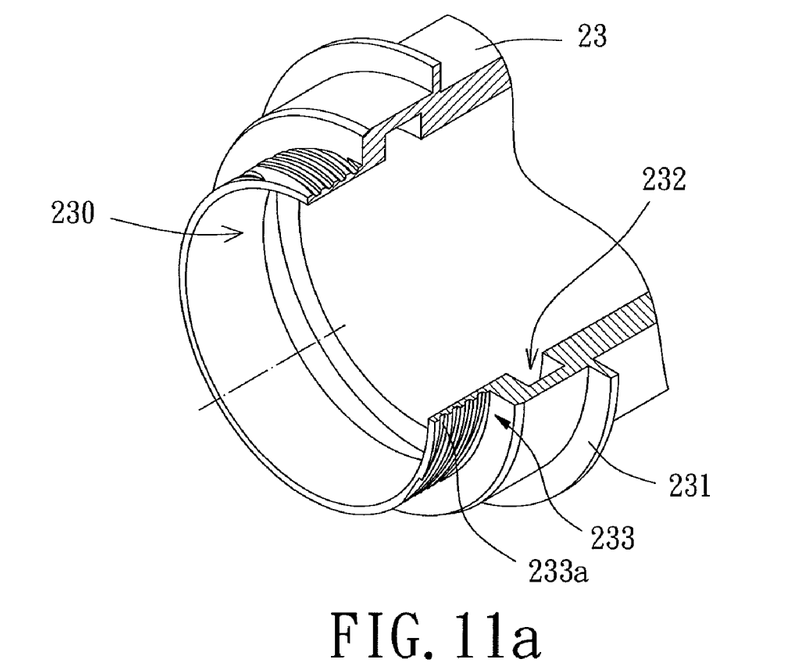
FIG. 11a is a partial, perspective view of a blade-formed stirring unit of the mechanical seal in accordance with the second embodiment of the present invention.
Figure 11B:
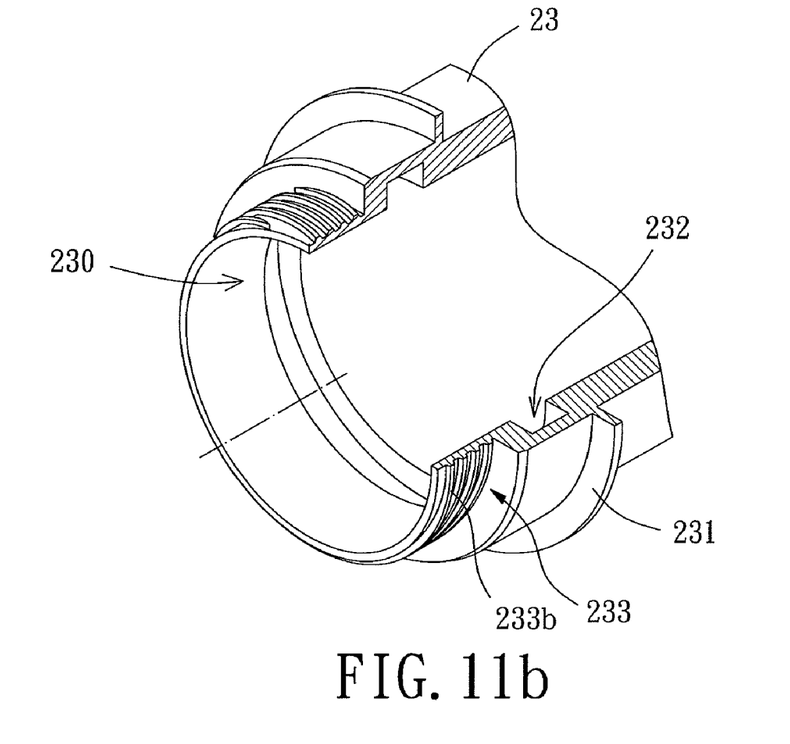
FIG. 11b is a partial, perspective view of a groove-formed stirring unit of the mechanical seal in accordance with the second embodiment of the present invention.

Now further referring to FIGS. 9 and 10, views of a mechanical seal in accordance with a second embodiment of the present invention are shown. Differences between the mechanical seals of the first and second embodiments are that a stirring unit 233 forms an end of the shaft sleeve 23 and an auxiliary guiding unit 219 is formed on an outer periphery of the primary ring 211. Regarding the stirring unit 233, the end of the shaft sleeve 23 provides the stirring unit 233 is adjacent to the first rotating seal ring 24 and also facing the inner of the housing. Particularly, the stirring unit 233 radially faces the said interface between the first rotating seal ring 24 and the corresponding stationary seal ring 13 outwards. Specifically, please further referring to FIGS. 11a and 11b, the stirring unit 233 can be formed by at least one helical groove 233a, or by at least one helical blade 233b. Preferably, form a middle part of the shaft sleeve 23 to the said end thereof, a circular extending direction of each helical groove 233a or helical blade 233b is opposite to a rotating direction of the shaft 9. Thereby, when the shaft 9 turns, the stirring unit 233 can drive the liquid received and stirred in the housing to flow beside the said interface, so as to prevent suspended impurities in the liquid from accumulating in the said interface.

Figure 12:
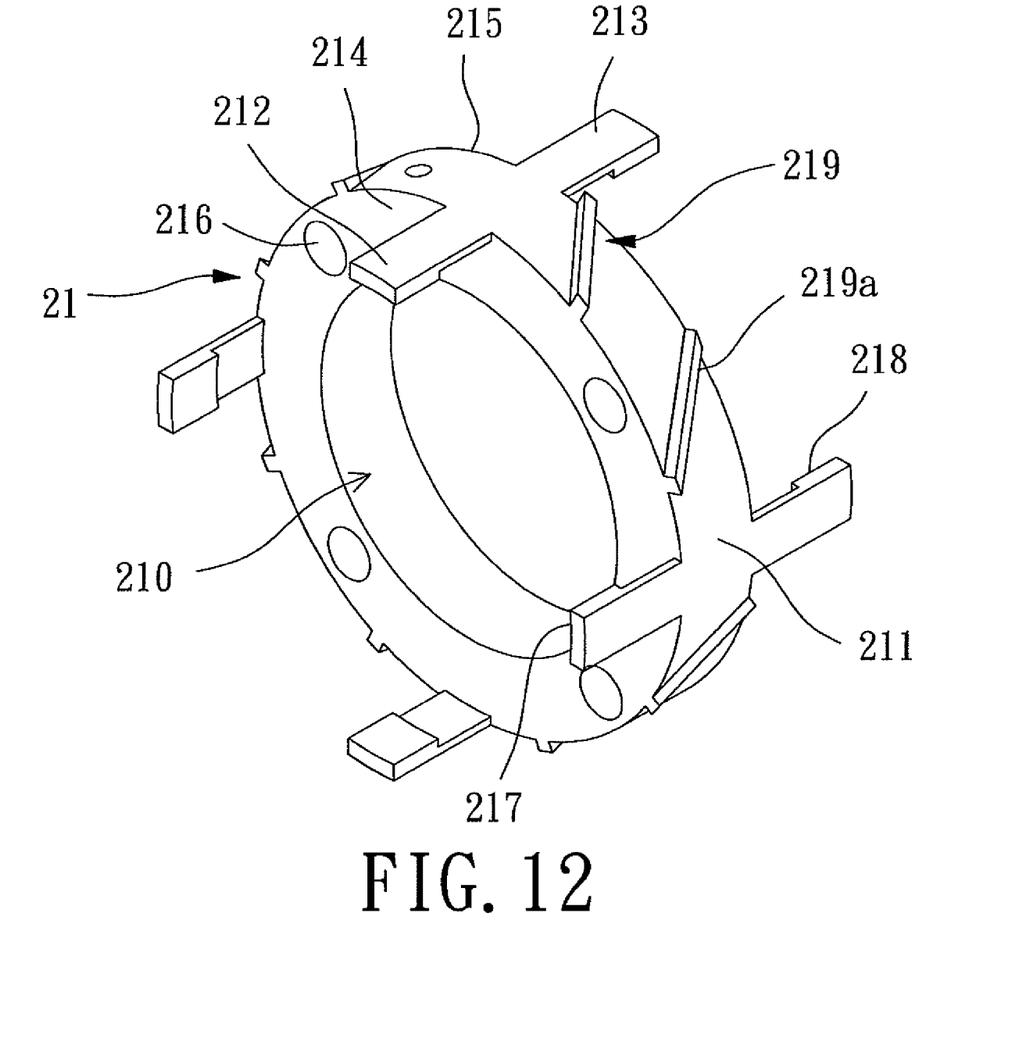
FIG. 12 is a perspective view of a blade-formed helical guiding unit of the mechanical seal in accordance with the second embodiment of the present invention.

Regarding the auxiliary guiding unit 219, referring to FIG. 12, the auxiliary guiding unit 219 is preferably provided with at least one radially outwards formed helical blade 219a. Therefore, the auxiliary guiding unit 219 can assist the flowing of the fluid received in the shaft bore 10.

Moreover, please refer to FIG. 9 again. In order to further enhancing efficiency in driving of the fluid, those untaken ones of the notches 243 or 252 can be inclined relative to the slide legs 212 or 213.

Figure 13:
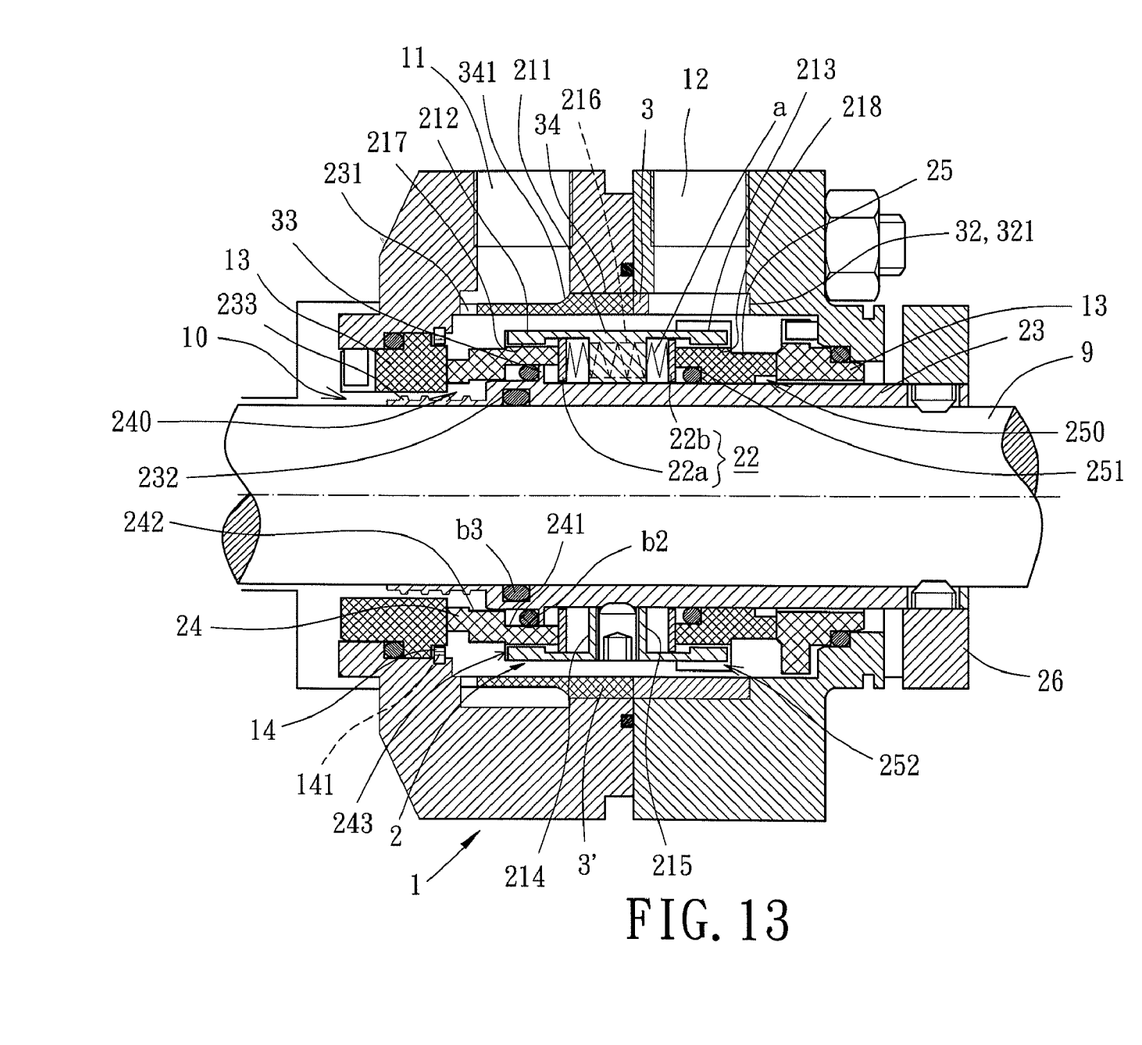
FIG. 13 is an assembled, cross-sectional view of a mechanical seal in accordance with a third embodiment of the present invention.
Figure 14:
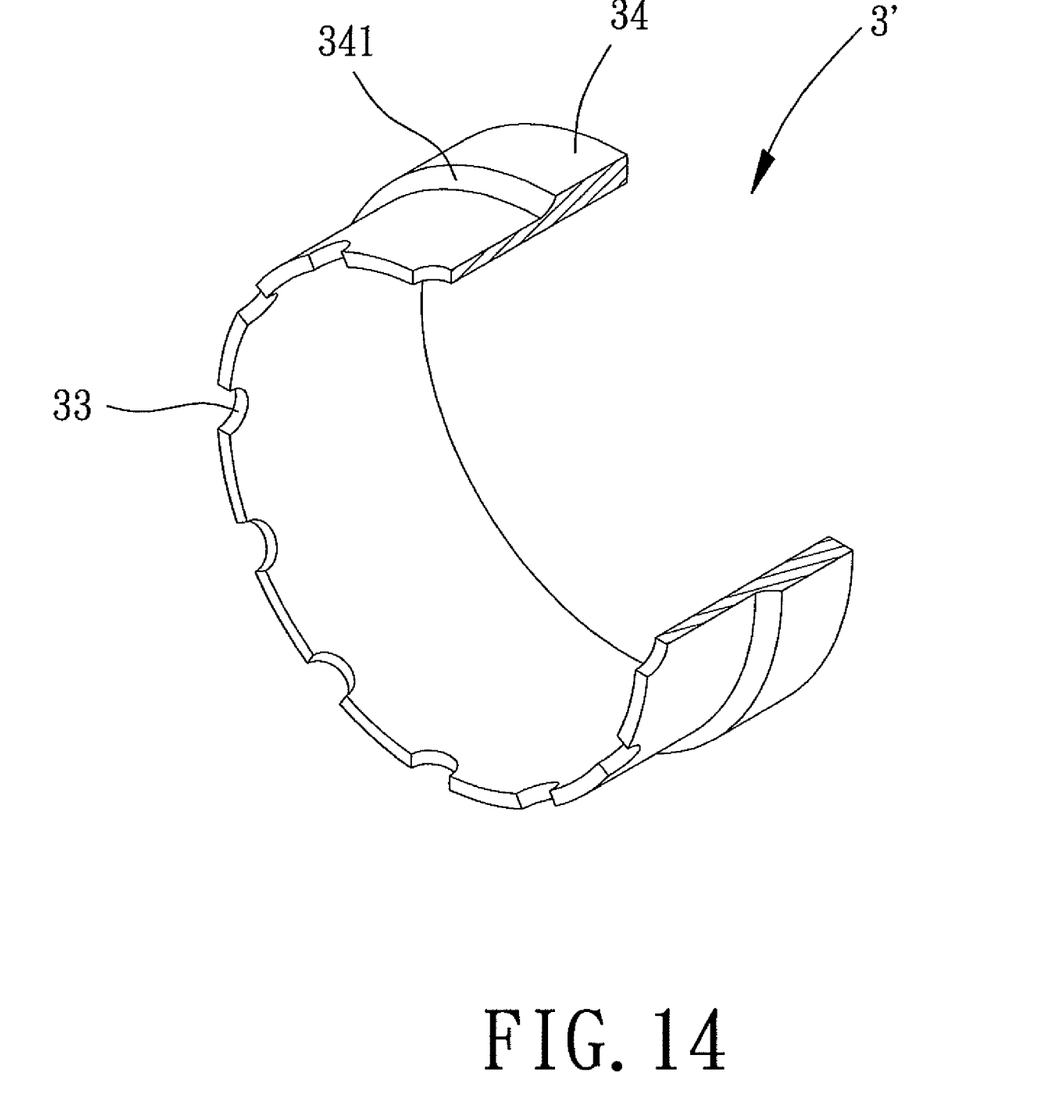
FIG. 14 is a perspective view of a fluid guiding member of the mechanical seal in accordance with the third embodiment of the present invention.

Now, please refer to FIGS. 13 and 14. Views of a mechanical seal in accordance with a third embodiment of the present invention are shown. Differences between the mechanical seals of the second and third embodiments are that the fluid inlet 11 and fluid outlet 12 radially extend in different axial levels relative to the shaft bore 10. Besides, the said fluid guiding member 3 is arranged adjacent to the fluid outlet 12, with the channel 32 aligning with the fluid outlet 12. Furthermore, another fluid guiding member 3' is also mounted on the inner wall of the gland 1 but adjacent to the fluid inlet 11. The fluid guiding member 3' is in a tube shape that is coaxial with the shaft bore 1 and has a first axial end providing a plurality of radial grooves 33 and a second axial end providing a radial extended annular protrusion 34. Particularly, an inner opening of each radial groove 33 faces first rotating seal ring 24, preferably the interface between the first rotating seal ring 24 and the stationary seal ring 13, inwards. The annular protrusion 34 connects with the inner wall of the gland 1 by an outer periphery thereof, and provides a curved surface 341 smoothly linking a surface of the fluid inlet 11 and an outer periphery of the fluid guiding member 3' out of the annular protrusion 34. Accordingly, the fluid guiding member 3' smoothly guides the fluid inputted from the fluid inlet 11 to pass through the radial grooves 33 and directly cooling down or heating up the first rotating seal ring 24 and stationary seal ring 13 close to the said interface.

As has been discussed above, base on the design of the retainer 21 and the compression rings 22, assembly and repair of the mechanical seal of the present invention without a disengagement of the spring members "a" is easy to be completed, which is absolutely unachievable for those sited prior arts.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A mechanical seal, comprising a gland for being mounted on a housing, a rotating assembly for being connected with a shaft, and two stationary seal rings separately received in the gland and axially arranged between the gland and rotating assembly, with an inner wall of the gland defining a shaft bore for the rotating assembly as well as the shaft to pass through, with the rotating assembly comprising:
   a retainer having a primary ring, a plurality of first slide legs, and a plurality of second slide legs, with the primary ring being coaxial with the shaft bore and defining a first axial surface and a second axial surface at two axial ends thereof, and a plurality of spring holes communicating the said first and second axial surfaces, with the first slide legs being formed on the first axial surface and axially extending outwards while an free end of each first slide leg has a first engaging block protruding to an axial line of the shaft bore, with the second slide legs being formed on the second axial surface and axially extending outwards while an free end of each second slide leg has a second engaging block protruding to the said axial line;
   a first compression ring being coaxial with the shaft bore and formed with at least one cutaway portion at an outer periphery thereof, with the first compression ring being movably positioned between the first axial surface and the first engaging block in axial direction, and being radially surrounded by the first slide legs;
   a second compression ring being coaxial with the shaft bore and also formed with at least one cutaway portion at an outer periphery thereof, with the second compression ring being movably positioned between the second axial surface and the second engaging block in axial direction, and being radially surrounded by the second slide legs;
   a plurality of spring members separately received in the spring holes and oppositely abutting against the first and second compression rings with two ends;
   a first rotating seal ring having one end being abutted by the first compression ring, with a plurality of first notches formed in a outer periphery of the first rotating seal ring, with an amount of the first notches being not less than an amount of the first slide legs for each first slide leg to be received in and engaged with one of the first notches;
   a second rotating seal ring having one end being abutted by the second compression ring, with a plurality of second notches formed in a outer periphery of the second rotating seal ring, with an amount of the second notches being not less than an amount of the second slide legs for each second slide leg to be received in and engaged with one of the second notches; and
   a shaft sleeve for being connected with the shaft sequentially passing through the first rotating seal ring, first compression ring, primary ring of the retainer, second compression ring, and second rotating seal ring;
   wherein the spring members oppositely pushe the first and second rotating seal rings through the first and second compression rings, and the first and second rotating seal rings respectively abut against the two stationary seal rings to form an interface between the first rotating seal ring and one of the stationary seal rings and another interface between the second rotating seal ring and the other stationary seal ring;
   wherein a smallest distance form the axial line of the shaft bore to each cutaway portion is not larger than a distance from the said axial line to each first or second engaging block, and radiuses of the outer peripheries of the two compression rings out of the at least one cutaway portion are larger than the said distance between the said axial line and each first or second engaging block, but are not larger than a smallest distance form the said axial line to each slide leg excluded the engaging blocks;
   wherein the at least one cutaway portion of the first compression ring is mis-aligned with each first slide leg for the first compression ring to be limited between the first engaging blocks and the first axial surface, and the at least one cutaway portion of the second compression ring is mis-aligned with each second slide leg for the second compression ring to be limited between the second engaging blocks and the second axial surface.

2. The mechanical seal as defined in claim 1, wherein an annular groove is provided on an inner periphery of the shaft sleeve and receives an O-ring.

3. The mechanical seal as defined in claim 1, wherein a positioning flange is disposed at an outer periphery of the shaft sleeve adjacent to the first rotating seal ring to limit an axial movement of an O-ring or the first rotating seal ring.

4. The mechanical seal as defined in claim 1, wherein an end of the shaft sleeve adjacent to the first rotating seal ring forms a stirring unit facing the said interface between the first rotating seal ring and the corresponding stationary seal ring outwards.

5. The mechanical seal as defined in claim 4, wherein, the stirring unit is formed by at least one helical groove or helical blade, with a circular extending direction of each helical groove or helical blade being opposite to a rotating direction of the shaft.

6. The mechanical seal as defined in claim 1, wherein at least one untaken notch is inclined relative to the first or second slide leg when the number of the notches of the first or second rotating seal ring is larger than the number of the first or second slide leg.

7. The mechanical seal as defined in claim 1, wherein gland further comprises a fluid inlet communicating the outside of the gland and the shaft bore.

8. The mechanical seal as defined in claim 7, wherein a fluid guiding member is mounted on the inner wall of the gland, between the said inner wall and the rotating assembly, and adjacent to the fluid inlet.

9. The mechanical seal as defined in claim 8, wherein the fluid guiding member is in a ring shape and coaxial with the shaft bore, and has a channel aligning with the fluid inlet, with each of two opposite edges that define the channel providing a guiding surface adjacent to and obliquely facing the fluid inlet.

10. The mechanical seal as defined in claim 8, wherein the fluid guiding member is in a tube shape being coaxial with the shaft bore 1 and having a first axial end with a plurality of radial grooves and a second axial end with a radial extended annular protrusion.

11. The mechanical seal as defined in claim 7, wherein the gland further comprises a fluid outlet communicating the outside of the gland and the shaft bore.

12. The mechanical seal as defined in claim 11, wherein the fluid inlet and fluid outlet radially extend in different axial levels relative to the shaft bore, with another fluid guiding member being mounted on the inner wall of the gland, between the said inner wall and the rotating assembly, and adjacent to the fluid outlet.

13. The mechanical seal as defined in claim 12, wherein the said another fluid guiding member is in a ring shape and coaxial with the shaft bore, and has a channel aligning with the fluid outlet, with at least one of two opposite edges that define the channel providing a guiding surface adjacent to and obliquely facing the fluid outlet.

14. The mechanical seal as defined in claim 11, wherein the fluid inlet and fluid outlet radially extend in an axial level relative to the shaft bore, with the fluid guiding member being also adjacent to the fluid outlet.

15. The mechanical seal as defined in claim 14, wherein the fluid guiding member is in a ring shape and coaxial with the shaft bore, and has a channel aligning with both of the fluid inlet and fluid outlet, with each of two opposite edges that define the channel providing a guiding surface, with the two guiding surface adjacent to and obliquely facing the fluid inlet and fluid outlet respectively.

16. The mechanical seal as defined in claim 1 further comprising a limiting member firmly engaged on the inner wall of the gland, adjacent to the stationary seal ring abutted by the first rotating seal ring, and radially protruding inwards.

17. The mechanical seal as defined in claim 16, wherein the limiting member is formed in a ring shape and coaxial with the shaft bore.

18. The mechanical seal as defined in claim 17, wherein a plurality of through holes extending between two axial faces of the limiting member.

19. The mechanical seal as defined in claim 1 further comprises an auxiliary guiding unit formed on an outer periphery of the primary ring.

20. The mechanical seal as defined in claim 19, wherein the auxiliary guiding unit is formed by at least one helical blade.

* * * * *